(12) United States Patent
Chang et al.

(10) Patent No.: US 7,333,349 B2
(45) Date of Patent: Feb. 19, 2008

(54) SINGLE-STAGE BUCK-BOOST INVERTER

(75) Inventors: Liuchen Chang, Fredericton (CA);
Zhuomin Liu, Moncton (CA)

(73) Assignee: University of New Brunswick,
Fredericton, New Brunswick (CA)

( * ) Notice: Subject to any disclaimer, the term of this patent is extended or adjusted under 35 U.S.C. 154(b) by 174 days.

(21) Appl. No.: 11/094,382

(22) Filed: Mar. 31, 2005

(65) Prior Publication Data

US 2005/0270000 A1 Dec. 8, 2005

Related U.S. Application Data

(60) Provisional application No. 60/557,688, filed on Mar. 31, 2004.

(51) Int. Cl.
*H02M 3/335* (2006.01)
*G05F 24/02* (2006.01)
*H02J 1/00* (2006.01)

(52) U.S. Cl. ............... 363/17; 363/40; 323/344; 323/345

(58) Field of Classification Search .......... 363/17, 363/40, 95, 98; 323/344, 345
See application file for complete search history.

(56) References Cited

U.S. PATENT DOCUMENTS 5,400,235 A * 3/1995 Carroll ............ 363/17
6,169,669 B1 * 1/2001 Choudhury ......... 363/37
6,483,730 B2 * 11/2002 Johnson, Jr. ........ 363/123
6,587,356 B2 * 7/2003 Zhu et al. .......... 363/17
6,876,556 B2 * 4/2005 Zhu et al. .......... 363/17
7,009,347 B2 * 3/2006 Henze ............. 315/246

OTHER PUBLICATIONS

N. Vazquez, et al., "Analysis and experimental study of the buck, boost and buck-boost inverters", Proc. IEEE-PESC'99, Jun. 27-Jul. 1, 1999, pp. 801-806.
N. Kasa et al., "An inverter using buck-boost type chopper circuits for popular small-scale photovoltaic power system", Proc. IEEE-IECON'99, 1997, pp. 185-190.
M. Nagao, "Power flow of photovoltaic system using buck-boost PWN power inverer", Proc. IEEE-PEDS'97 , 1997, pp. 144-149.
S. Funabiki et al., "A new buck-boost-operation-based sinusoidal inverter circuit", Proc. IEEE-PESC'02, 2002, pp. 1624-1629.
S. Saha et al, "Novel grid-connected photovoltaic inverter", IEEE Proc. Gener. Transm. Distrib., vol. 143, pp. 219-224, Mar. 1996.
F. Blaabjerg et al., "A new optimized space-vector modulation et al.", IEEE Trans. Power Electron., vol. 12 pp. 704-714, Jul. 1997.

* cited by examiner

*Primary Examiner*—Bao Q. Vu
(74) *Attorney, Agent, or Firm*—Eugene F. Derenyl

(57) ABSTRACT

An improved Single-Stage Buck-Boost inverter ($S^2B^2$ Inverter) is provided, using only three or four power semiconductor switches and two coupled inductors in a flyback arrangement. The inverter can handle a wide range of dc input voltages and produce a fixed ac output voltage. The inverter is well suited to distributed power generation systems such as photovoltaic and wind power and fuel cells, for standalone or grid connected applications. The inverter has a single charge loop, a positive discharge loop and a negative discharge loop.

7 Claims, 11 Drawing Sheets

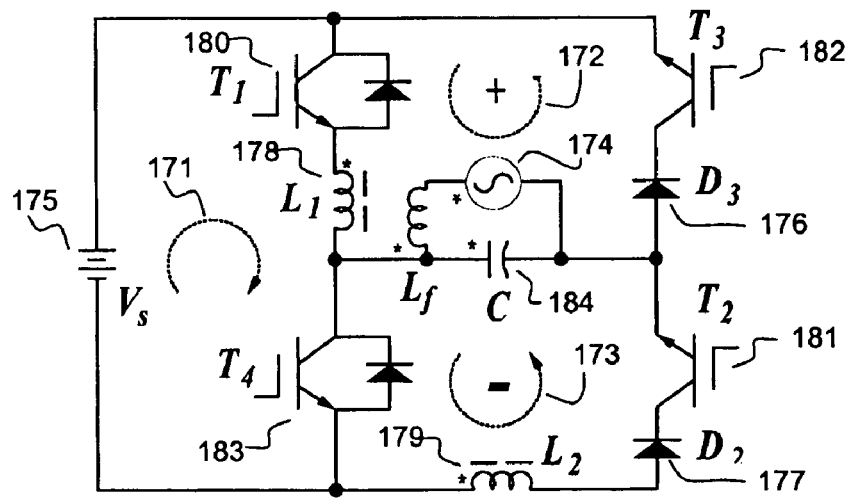
FIG. 17    170
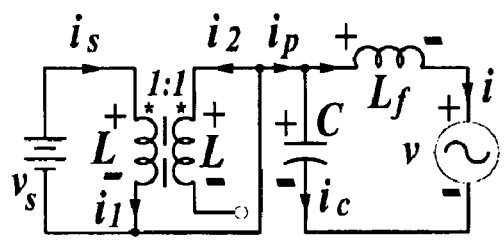
FIG. 18
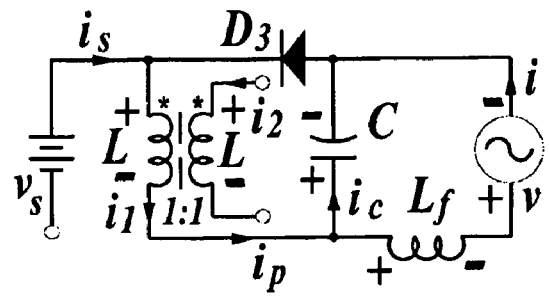
FIG. 19
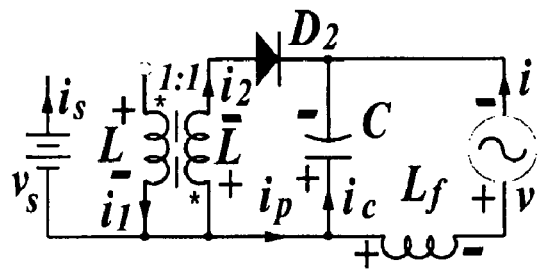
FIG. 20
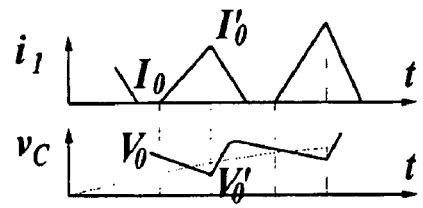
FIG. 21

SINGLE-STAGE BUCK-BOOST INVERTER

CROSS-REFERENCE TO RELATED APPLICATIONS

This application claims the benefit of U.S. provisional patent application 60/557,688, filed Mar. 31, 2004.

MICROFICHE APPENDIX

Not Applicable.

TECHNICAL FIELD

The present invention relates generally to power converters and more particularly to DC to AC buck-boost power inverters.

BACKGROUND OF THE INVENTION

Increasing global energy consumption and noticeable environmental pollution are making renewable energy more important. Today, a small percentage of total global energy comes from renewable sources, mainly hydro and wind power. However, global energy consumption is expected to expand by 58% between 2001 and 2025. As more countries ratify the Kyoto Accord, an international agreement to reduce greenhouse gas (GHG) emissions, new power generation capacity can no longer be met by traditional methods such as burning coal, oil, natural gas, etc. Also, these traditional sources are predicted to last only about 100 to 200 years in the world. Nuclear power plants have experienced safety problems and disposal of nuclear waste remains a serious issue. These issues increase the importance of renewable energy.

Energy from the wind, sun, water, waves, tides, etc., is renewable and essentially inexhaustible but the output from such sources is widely dispersed and generally sporadic, fluctuating dramatically with the weather and the seasons. Distributed generation (DG) technologies provide a potential solution of increasing electrical power generation capacity for renewable energy systems. Compared to large, centralized power grids, DG systems are usually small modular devices with increased security and reliability, and are generally close to electricity users, thus reducing the problems of power transmission and power quality issues due to very long transmission lines. DG systems often need dc-ac converters or inverters as an interface between their power sources and their typical single-phase loads. DG systems typically must deal with a wide range of input voltage variations due to the sporadic nature of the energy sources, which imposes stringent requirements on power inverters. Power inverters for small DG systems typically have the following requirements: (1) converting the variable incoming dc voltage into a fixed ac voltage with a fixed frequency; (2) ensuring output power quality with well controlled output frequency and low total harmonic distortion (THD); (3) providing electrical isolation and protection if necessary; and (4) low cost and high efficiency. DG systems are typically used to supplement the traditional electrical power grid and are often connected to the grid. In such cases, output power quality must meet specific standards, such as the interconnection requirements of IEEE 1547. For DG systems, the power grid source is strong enough to establish the output voltage waveform of inverters, thus the output current waveform and output power are often controlled objectives.

Traditional single-phase full-bridge inverters 100, as shown in FIG. 1 do not have the flexibility of handling wide ranges of input voltage. They often require large, heavy line-frequency step-up transformers 102 when handling low voltage dc inputs.

Examples of prior art two stage inverters are shown in FIG. 2, FIG. 3, FIG. 4, and FIG. 5.

Interest in buck-boost inverters has grown notably with the development of sustainable DG energy systems in recent years, because buck-boost inverters can handle a wide range of input voltages, both lower and higher than the desired ac output voltage. Examples of prior art two stage buck-boost inverters are shown in FIG. 6, FIG. 7, and FIG. 8.

Compared to two-stage buck-boost inverters, most of single-stage buck-boost inverters present a compact design with a good performance-cost ratio, but they suffer from low power capacity and limited operation range imposed to dc sources. Several $S^2B^2$ inverter topologies have been proposed in recent years. Examples of prior art single-stage buck-boost inverters are shown in FIG. 9, FIG. 10, FIG. 11, FIG. 12, FIG. 13, FIG. 14, and FIG. 15. Some of them still have higher component count and more complicated operations, even compared with a two-stage inverter, and thus compromise their benefits. Others limit their applications by either requiring split dc sources (FIG. 12) or imposing very high switching frequency (FIG. 13, FIG. 15) to demonstrate performance, or presenting low power ratings (FIG. 15).

Accordingly, an improved power converter having low power component count, wide input voltage range and improved performance, remains highly desirable.

SUMMARY OF THE INVENTION

It is therefore an object of the present invention to provide an improved single-stage buck-boost inverter for handling a wide range of DC input voltage.

The simple circuit topology of the present invention provides the possibility for a low cost and high efficiency power converter. The inverter has a low component count with only four power switches, four diodes, and a compact high frequency transformer. Compared to traditional buck inverters with line-frequency transformers, two-stage buck-boost inverters, and many of single-stage buck-boost inverters, both the cost and size are reduced, thereby presenting a more reliable and more economic design in small DG systems. Two current control schemes, DCM and CCM, are presented with amplitude modulation techniques.

Accordingly, an aspect of the present invention provides a single-stage buck-boost inverter, comprising: an input for receiving DC power; an output operable to provide AC power; a first inductor; a first switching means to controllably connect said first inductor to said input; a first discharge loop for conveying power to said output; a second switching means to controllably connect said first inductor to said first discharge loop; a second inductor magnetically coupled to said first inductor; a second discharge loop for conveying power to said output; a third switching means to controllably connect said second inductor to said second discharge loop.

In some embodiments, said first discharge loop is operable to convey power during a positive half cycle of output and said second discharge loop is operable to convey power during a negative half cycle of output.

Some embodiments, further comprising a control means for controlling said first, second and third switching means so as to generate an AC power signal at said output.

In some embodiments, said first switching means comprises a first semiconductor switch and a second semiconductor switch.

In some embodiments, said second switching means comprises said first semiconductor switch and a third semiconductor switch and said third switching means comprises said second semiconductor switch and a fourth semiconductor switch.

In some embodiments, each said first and second discharge loop further comprises an isolation diode to isolate said output from said input.

In other embodiments said first switching means comprises one semiconductor switch.

BRIEF DESCRIPTION OF THE DRAWINGS

Further features and advantages of the present invention will become apparent from the following detailed description, taken in combination with the appended drawings, in which:

FIG. 17 is a schematic illustration of a first embodiment of a single-stage buck-boost inverter of the present invention;

FIG. 18 is a schematic illustration of an approximate equivalent circuit of the charge mode of the embodiment of FIG. 17;

FIG. 19 is a schematic illustration of an approximate equivalent circuit of the positive half-cycle (PHC) discharge mode of the embodiment of FIG. 17;

FIG. 20 is a schematic illustration of an approximate equivalent circuit of the negative half-cycle (NHC) discharge mode of the embodiment of FIG. 17;

FIG. 21 is a graphical representation of exemplary inductor current and capacitor voltage;

It will be noted that, throughout the appended drawings, like features are identified by like reference numerals.

DETAILED DESCRIPTION OF THE PREFERRED EMBODIMENT

The present invention provides an improved Single-Stage Buck-Boost ($S^2B^2$) inverter. Most $S^2B^2$ inverters are derived from buck-boost dc-dc converter designs, where flyback principles are applied to transfer the energy from input side to output side. Two basic criteria are used to construct a buck-boost dc-dc converter, also called dc chopper. These criteria are: 1) an independent charge loop with respect to load, where an inductor or flyback transformer is usually used to store the energy; and 2) an independent discharge loop with respect to dc source, where the energy-storage element acts as the source to load.

For a $S^2B^2$ inverter, the first criterion guarantees no short circuit in dc link, thereby avoiding the dead-time problem as seen in traditional buck inverters. For grid-connected inverters, the second criterion decouples the ac output from the dc source when discharging, and therefore facilitates a sine wave output. For unidirectional grid-connected inverter systems, there are two additional criteria: 3) half-wave inversion; and 4) proper isolation of power flow from grid to dc source. In some cases for safety reasons, electric isolation is achieved by high-frequency transformers.

Figure 9:
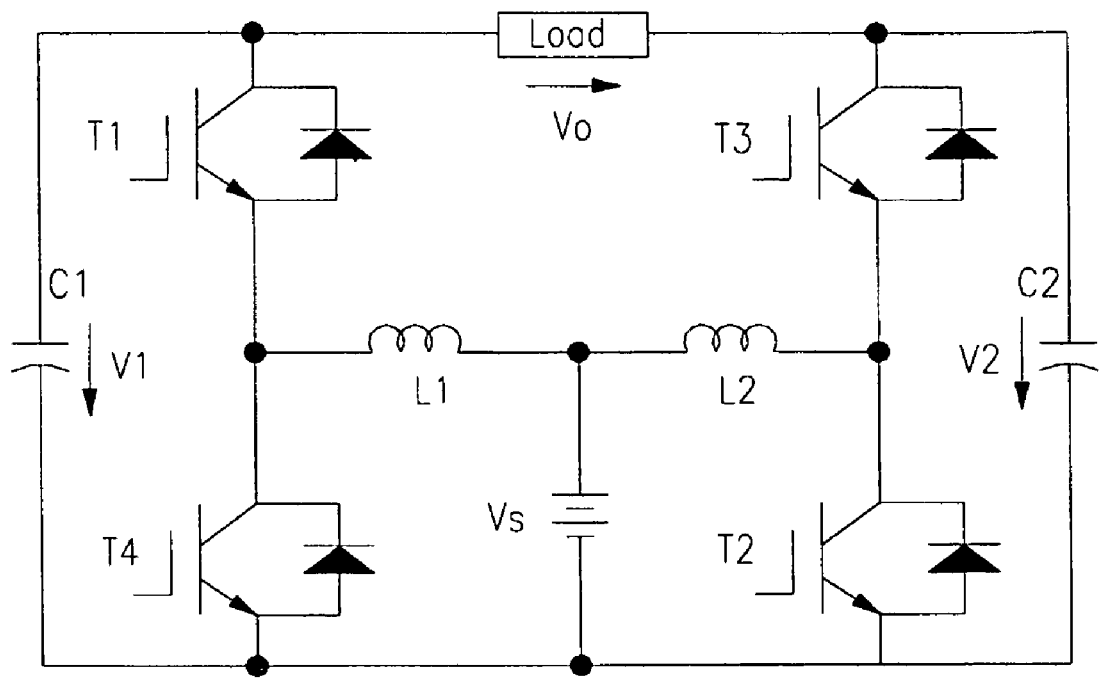
FIG. 9 is a schematic illustration of a prior art single-stage buck-boost inverter.
Figure 10:
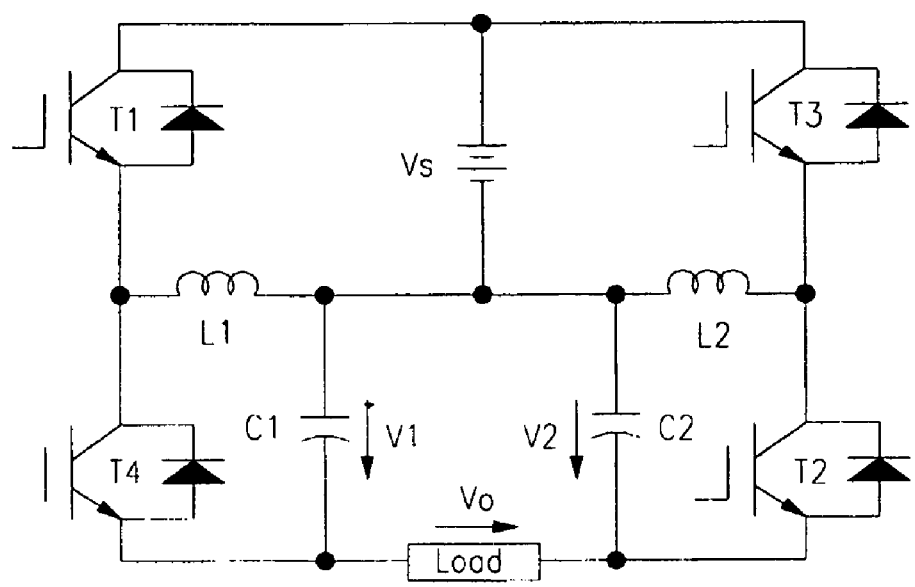
FIG. 10 is a schematic illustration of a prior art single-stage buck-boost inverter.
Figure 11:
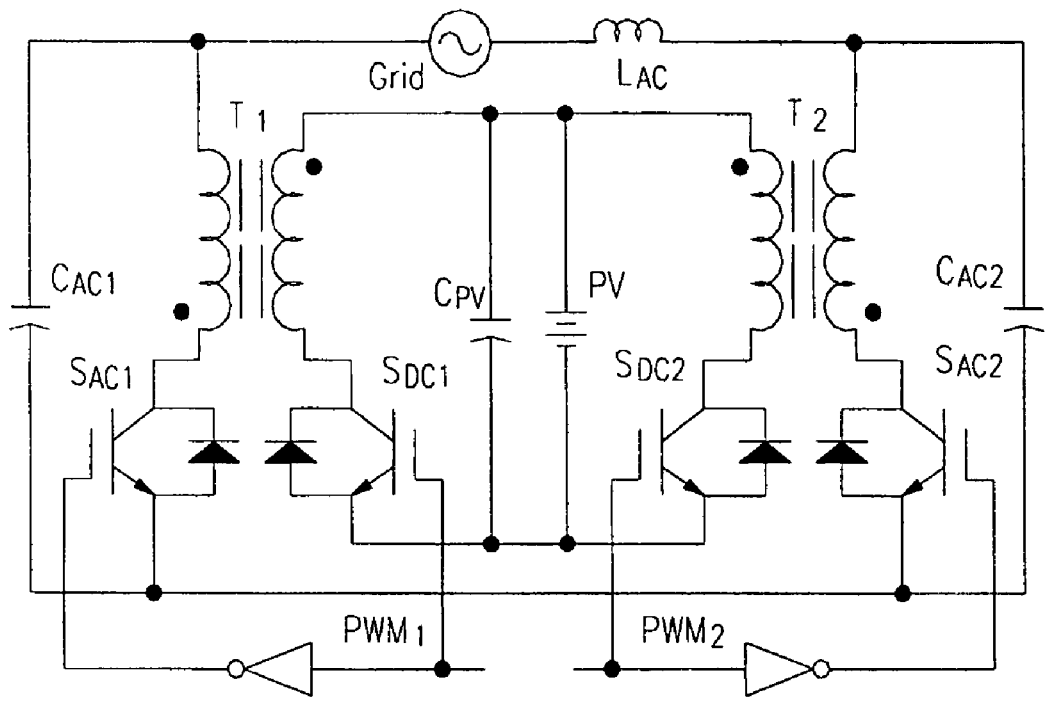
FIG. 11 is a schematic illustration of a prior art single-stage buck-boost inverter.
Figure 12:
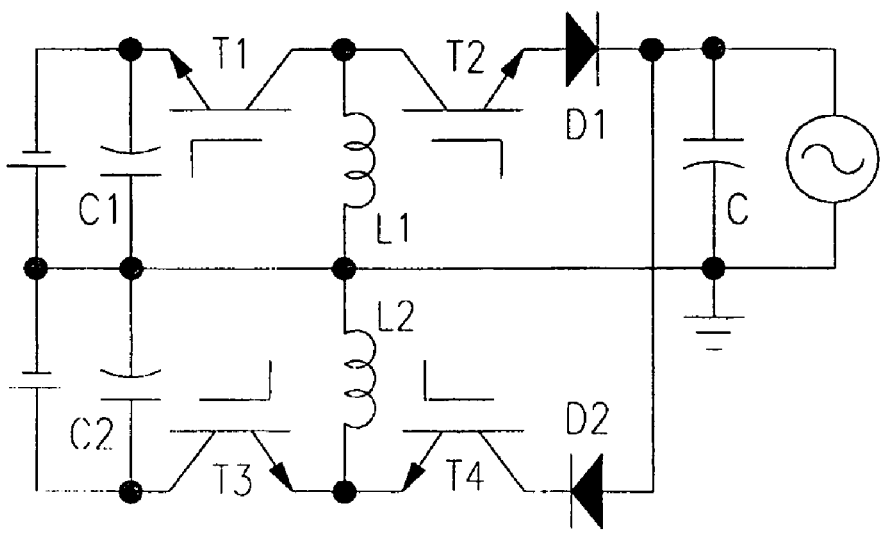
FIG. 12 is a schematic illustration of a prior art single-stage buck-boost inverter.
Figure 13:
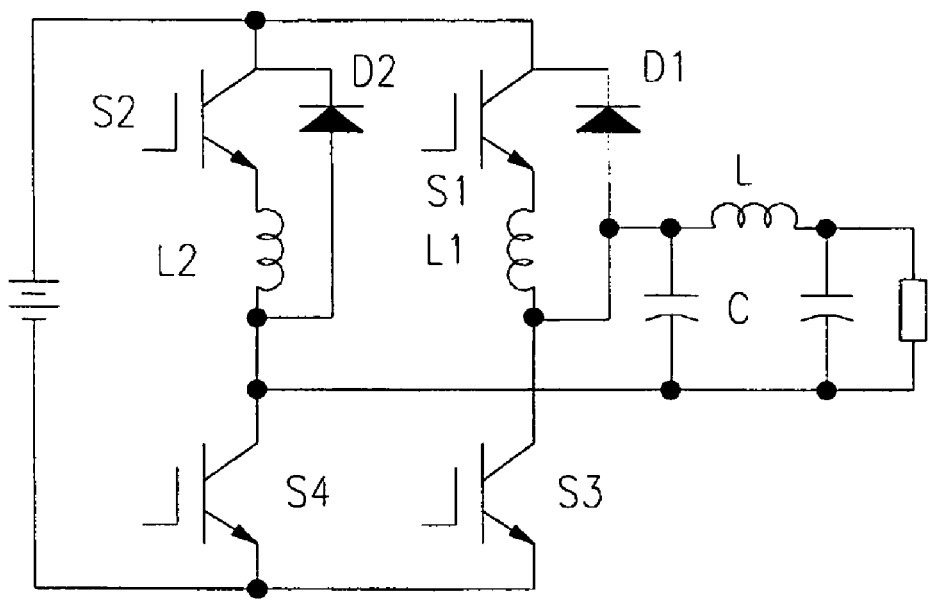
FIG. 13 is a schematic illustration of a prior art single-stage buck-boost inverter.
Figure 14:
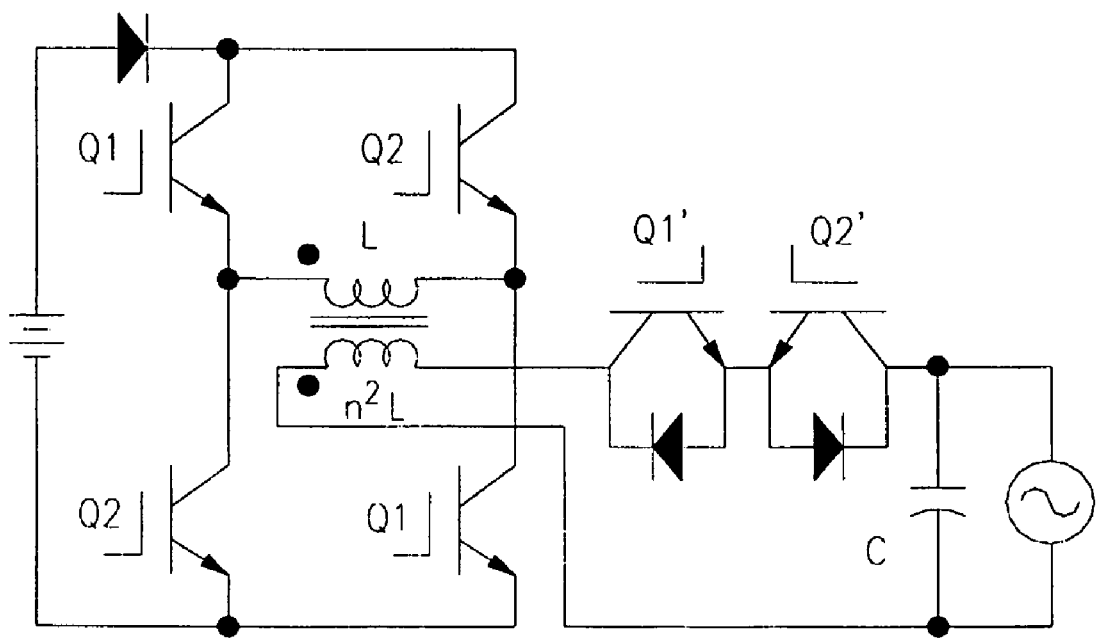
FIG. 14 is a schematic illustration of a prior art single-stage buck-boost inverter.
Figure 15:
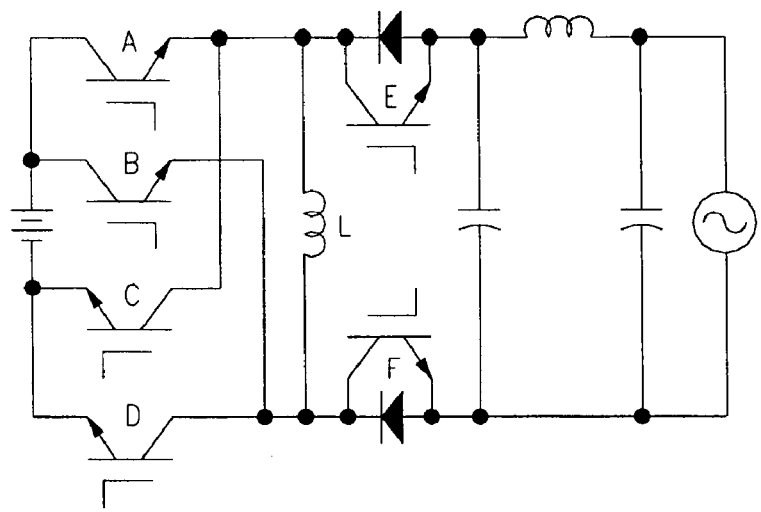
FIG. 15 is a schematic illustration of a prior art single-stage buck-boost inverter.
Figure 16:
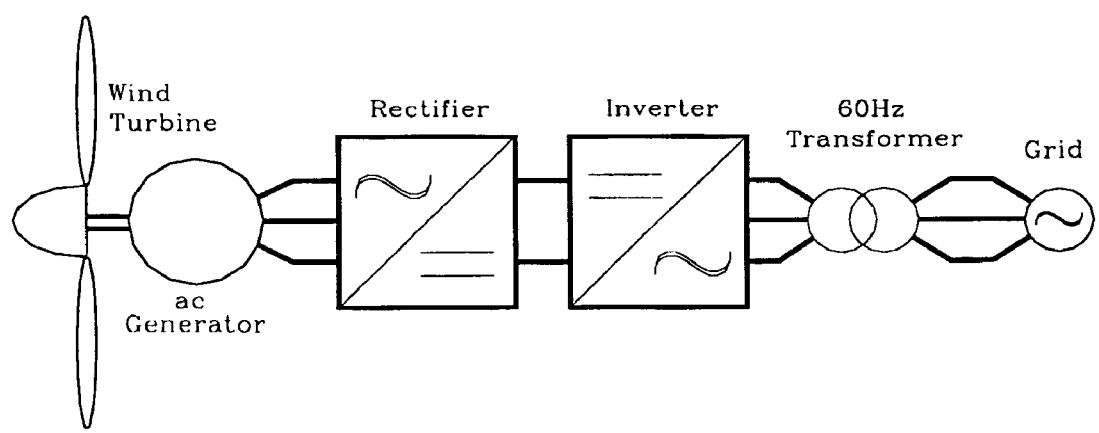
FIG. 16 is a block diagram of a typical wind energy system for use with the present invention.

Addressing the aforesaid four criteria, different topologies can be integrated by combining either: 1) one inductor, one charge loop, and two discharge loops; 2) one inductor, two charge loops, and one discharge loop, like the topology of FIG. 15; or 3) two inductors, two charge loops, and two discharge loops, like the topologies of FIGS. 9, 10, and 12.

FIG. 17 is a schematic illustration of a first embodiment of the $S^2B^2$ inverter 170 of the present invention. It consists of one charge loop 171 ($T_1$ 180, $L_1$ 178, and $T_4$ 183) and two discharge loops 172, 173 ($T_1$ 180, $L_1$ 178, C 184, $D_3$ 176, and $T_3$ 182 for the positive half cycle 172; and $T_4$ 183, $L_2$ 179, $D_2$ 177, $T_2$ 181, and C 184 for the negative half cycle 173). The reverse power flow from grid 174 to source $V_s$ 175 is blocked by $D_3$ 176 and $D_2$ 177. The energy-storage components, $L_1$ 178 and $L_2$ 179, are the primary and secondary windings of a flyback transformer and have identical inductance (L) and number of turns. As is well understood in the art, the switches $T_1$ 180, $T_2$ 181, $T_3$ 182 and $T_4$ 183, are controlled by a separate control circuit not illustrated in FIG. 17.

Each of the functional loops 171, 172, 173 is associated with one of three switch operation modes. Charge loop 171 is used in charge mode, wherein switch $T_1$ 180 and $T_4$ 183 are on and switch $T_2$ 181 and $T_3$ 182 are off. An approximate equivalent circuit is shown in FIG. 18 without the consideration of inductor copper loss and semiconductor conduction losses.

A first discharge loop 172 is used in the positive half cycle (PHC) discharge mode wherein switch $T_4$ 183 is turned off and $T_3$ 182 is turned on, while $T_1$ 180 is turned on and $T_2$ 181 is turned off. An approximate equivalent circuit is shown in FIG. 19. After the inductor $L_1$ 178 is charged in charge mode, its current $i_1$ reaches a peak value $I'_0$. During the course of PHC discharge mode, the energy stored in the inductor $L_1$ 178 is transferred both to grid 174 and to capacitor C 184 temporarily, which will be transferred to the grid 174 to support a continuous output during the time when the inductor $L_1$ 178 is being charged again.

Since the inductor $L_1$ 178 is in the discharge mode, its current $i_1$ is decreasing. If the change of capacitor voltage, $\Delta v_c$, is small compared to its absolute value, current $i_1$ can be regarded dropping linearly. Moreover, current $i_1$ will drop to zero provided the time duration of PHC discharge mode is long enough. Thereafter it will keep zero until the next occurrence of the charge mode because the diode $D_3$ 176 blocks the current to flow back from the capacitor C 184.

Two current conduction modes can be defined here, which we will discuss later. If the time of PHC discharge mode is so short that the inductor $L_1$ 178 starts being charged without its current decreasing to zero when next charge mode comes, the current of energy-storage inductor $L_1$ 178 is continuous, referred to as continuous conduction mode (CCM). On the other hand, if the inductor current drops zero in PHC discharge mode and remains zero for a time defined as the idle time, this will lead to a discontinuous conduction mode (DCM), as illustrated in FIG. 21. If the idle time is zero, the condition is known as the critical DCM.

Generally, in the PHC of ac output, energy is transferred from the dc source 175 to the ac grid 174 through alternate cycles of charge mode and PHC discharge mode.

A second discharge loop 173 is used in the negative half cycle (NHC) discharge mode which is combined with charge mode to provide NHC ac output when switch $T_1$ 180 is tuned off and $T_2$ 181 is turned on. The approximate equivalent circuit of NHC discharge mode is shown in FIG. 20.

Through flyback operation, the current of the primary side $L_1$ 178 drops to zero suddenly and the current of secondary side $L_2$ 179 reaches to the initial current of primary side $L_1$ 178, if the inductances and turns of both sides are identical and there is no magnetic leakage.

The major differences between NHC discharge mode and PHC discharge mode are that the ac grid 174 is in the negative half cycle and the discharging current has an opposite direction. The operation of the NHC discharge mode are similar to that of the PHC discharge mode. The NHC energy is transferred from the dc source 175 to the ac grid 174 through $L_1$ 178, $L_2$ 179 and C 184 by alternating cycles of charge mode and NHC discharge mode.

Thus, during the PHC of output, the inverter alternates between the charge mode and the PHC discharge mode. During the NHC of output, the inverter alternates between the charge mode and the NHC discharge mode.

The inductor current can be controlled in either a discontinuous conduction mode (DCM) or continuous conduction mode (CCM). In both schemes, the purpose is to obtain an output current, $i_p$, so that minimal filtering is required to recover or modulate the sinusoidal current waveform.

Figure 22:
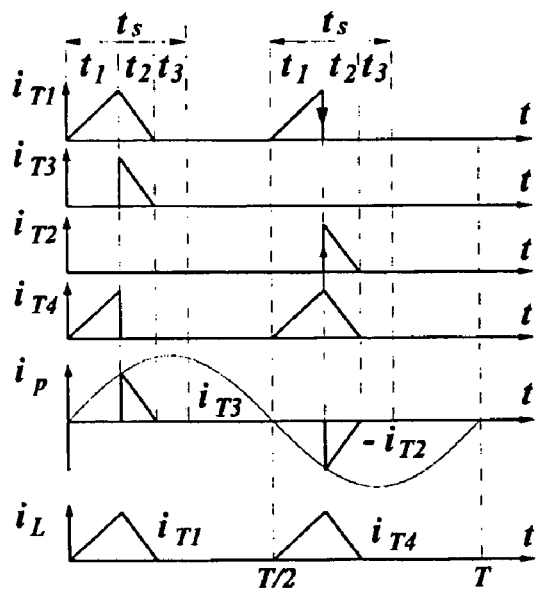
FIG. 22 is a graphical representation of exemplary unfiltered output current in a DCM scheme.

In DCM, at each switching interval, the energy-storage inductor $L_1$ 178 is charged from zero and discharged to zero. The inductor current is discontinuous, and comprises the current through $T_1$ 180 in PHC and the current through $T_4$ 183 in NHC. The unfiltered output current is multiple triangular pulses whose amplitudes are modulated in a sinusoidal way, as illustrated in FIG. 22.

Figure 23:
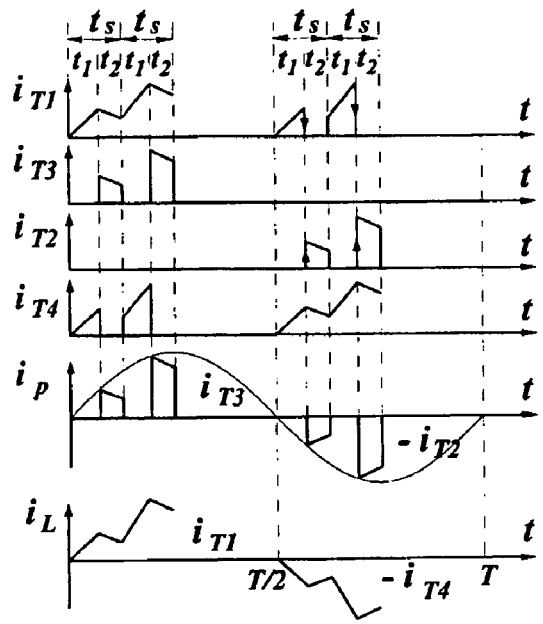
FIG. 23 is a graphical representation of exemplary unfiltered output current in a CCM scheme.

In CCM, the inductor current is controlled to follow a sinusoidal waveform within a small envelope. The unfiltered output current is multiple trapezoidal pulses with amplitudes distributed sinusoidally, as illustrated in FIG. 23.

The output current depends on the low-frequency components of unfiltered output current, and the peak value of unfiltered output current is determined by the inductor peak current. For the DCM scheme, the inductor peak current is dependent on both the maximum charging time and the inductance. The output current is thus affected by the switching frequency and the inductance of energy-storage component to a certain extent. For CCM scheme, the selection of inductor value can be wide because the change of $i_L$ is gradual within the small hysteresis bands. Another advantage of the CCM scheme is the fundamental component of unfiltered output current is larger than that of DCM, provided their unfiltered output currents have same peak values because the area of a trapezoidal pulse is larger than that of triangular pulse.

Representative component selection will now be discussed. The present invention is well suited to the use of Insulated Gate Bipolar Transistor (IGBT) power switches for $T_1$ 180, $T_2$ 181, $T_3$ 182, and $T_4$ 183. For small DG energy systems, exemplary IGBT switch parameters are as follows: $V_{dc}$=300V and $P_o$=1 kW, where the maximum $V_{ce}$ is about 500V and the average current and peak current are 15A and 60A respectively. An example of a typical IGBT is International Rectifier's IRG4PF50WD. An exemplary power diode $D_2$ 177 and $D_3$ 176 is part 40EPS12.

Figure 24:
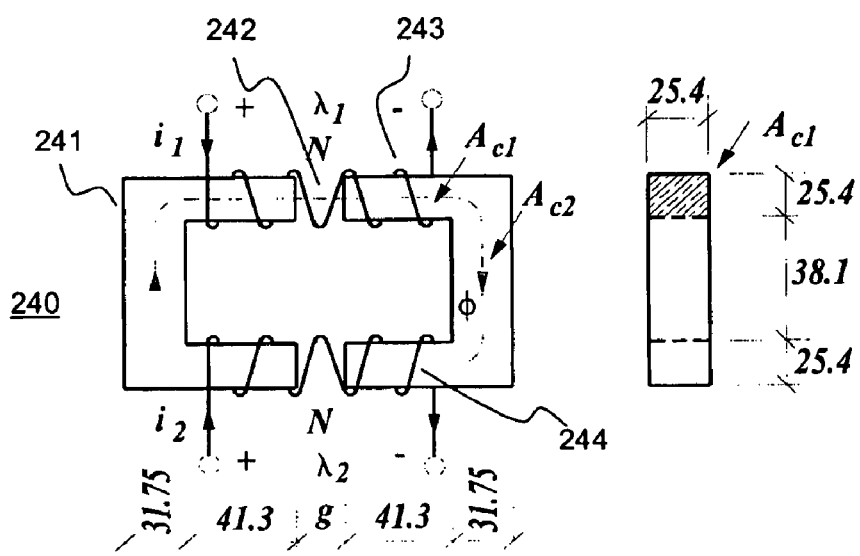
FIG. 24 is an illustration of an exemplary flyback transformer (magnetically coupled inductors) of the present invention.

The mutually magnetically coupled inductors $L_1$ 178 and $L_2$ 179 can be implemented as a flyback transformer. As is well known in the art, a flyback transformer is a specialized transformer optimized to store magnetic energy. FIG. 24 illustrates an exemplary flyback transformer 240 for use in the present invention. The flyback transformer core 241 has a high reluctance, typically with an air gap 242. Current flows in either the primary winding 243 (equivalent to $L_1$ 178) or secondary winding 244 (equivalent to $L_2$ 179), but not both at the same time, because the energy is stored in the magnetic circuit when the primary side 243 ($L_1$ 178) is connected to the source, and transferred to the secondary side 244 ($L_2$ 179 when the primary side is disconnected. The flyback transformer 240 thus comprises two highly-coupled inductors $L_1$ 178 and $L_2$ 179 with equal inductances and number of turns. In an exemplary $S^2B^2$ inverter, the flyback transformer is designed to work in DCM with an operating frequency of 9.6 kHz.

Figure 26:
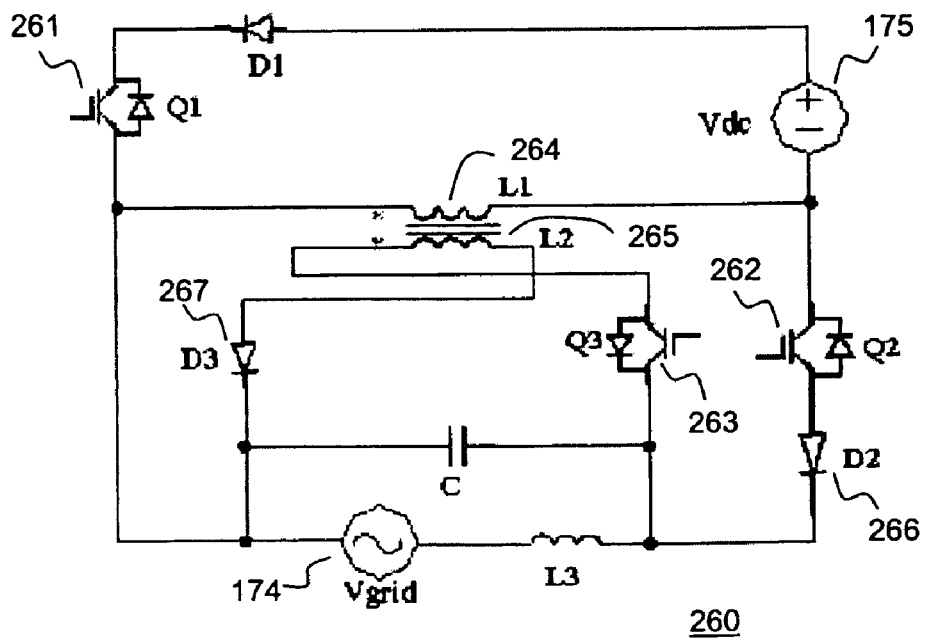
FIG. 26 is a schematic illustration of a second embodiment of a single-stage buck-boost inverter of the present invention.

A second embodiment of the present invention is illustrated in FIG. 26. This single-stage buck-boost inverter 260 uses only three switching devices 261, 262, 263.

The circuit operation can be divided into four modes. Mode 1 and mode 2 work in positive half cycle, and mode 3 and mode 4 work in negative half cycle.

Positive half cycle: During mode 1, switching device Q1 261 is turned on and switching devices Q2 262 and Q3 263 are turned off, the coupled inductor L1 264 will be charged with input voltage 175; and during mode 2, switching device Q1 261 and Q3 263 are turned off and Q2 262 is turned on, the energy in L1 264 will be discharged to the grid through D2 266.

Negative half cycle: During mode 3, switching device Q1 261 is turned on again (Q2 262 and Q3 263 are turned off) and the coupled inductor L1 264 will be charged; and during mode 4, switching device Q1 261 and Q2 262 will turned off and switching device Q3 263 will turned on, the energy transferred to the coupled inductor L2 265 from L1 264, will be discharged to the grid 174 in reverse direction (compared to the positive half cycle) through D3 267.

In an exemplary embodiment, the inductances of the two coupled inductors L1 264 and L2 265 are 0.5 mH, the filter parameters are L=2 mH, and C=25 uF.

The inverter of the present invention can be controlled using control techniques well known in the art. A technique well suited to the inverter of the present invention is Sinusoidal PWM, also known as subharmonic or suboscillation modulation, and is a carrier-based voltage control method. Its purpose is to synthesize the switch gating signals to the switches in such a way that the output voltage or current waveform is as close to a sinusoid as economically possible.

Figure 1:
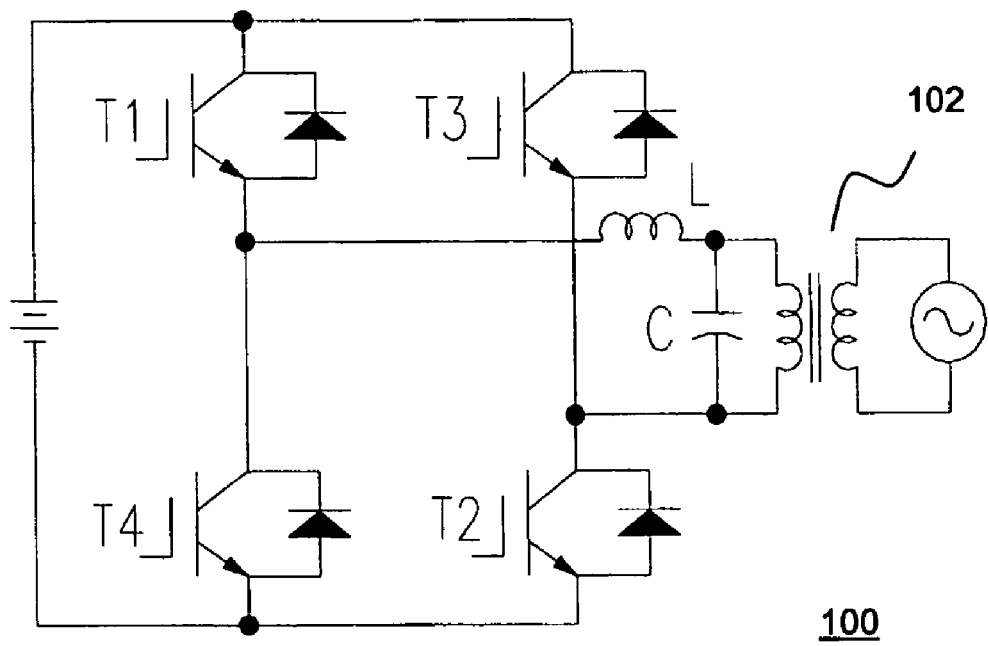
FIG. 1 is a schematic illustration of a prior art full bridge inverter.
Figure 2:
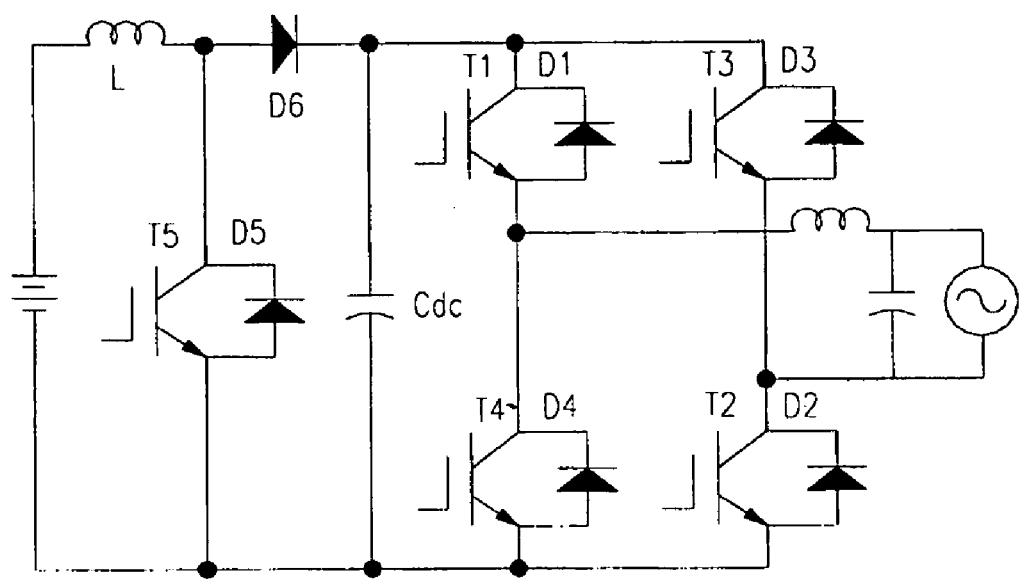
FIG. 2 is a schematic illustration of a prior art two stage inverter.
Figure 3:
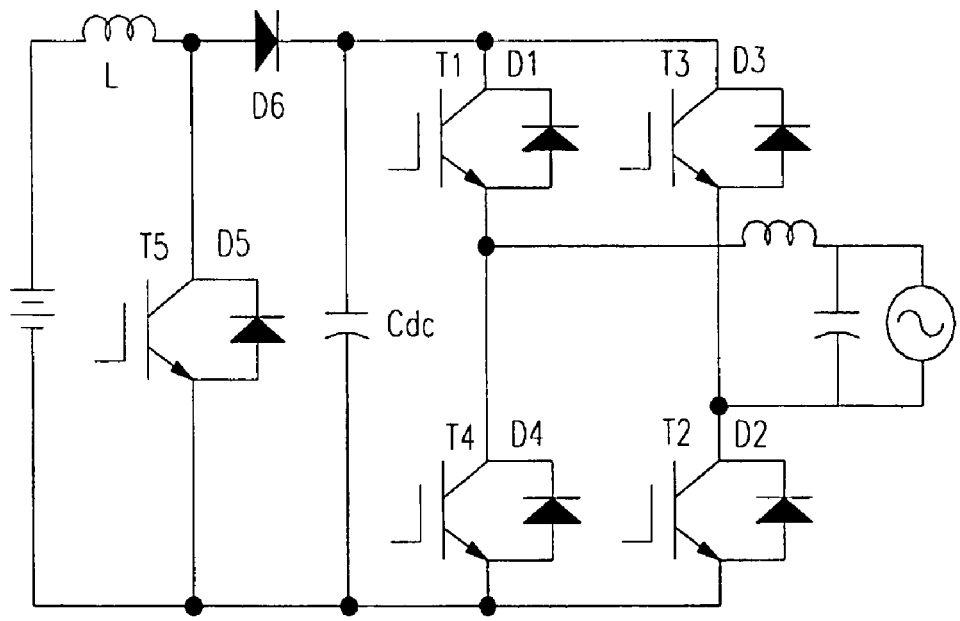
FIG. 3 is a schematic illustration of a prior art two stage inverter.
Figure 4:
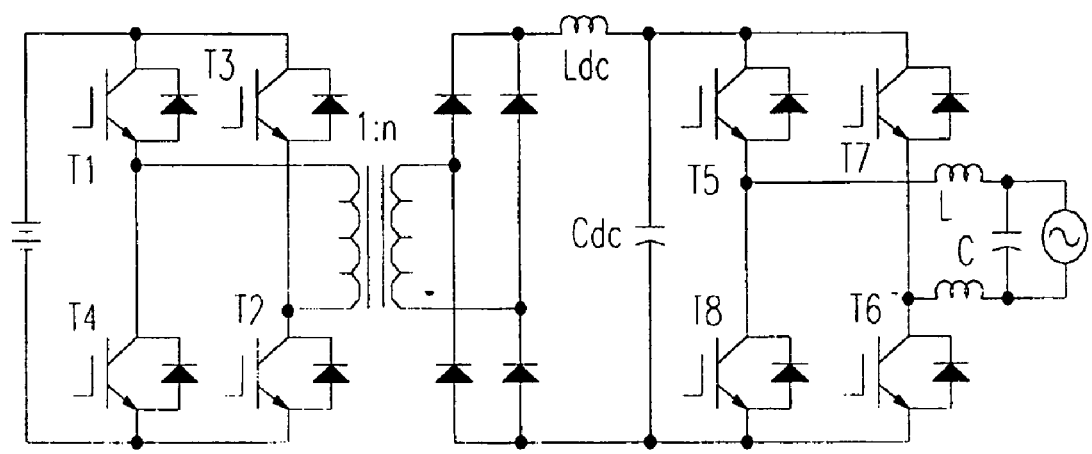
FIG. 4 is a schematic illustration of a prior art two stage inverter.
Figure 5:
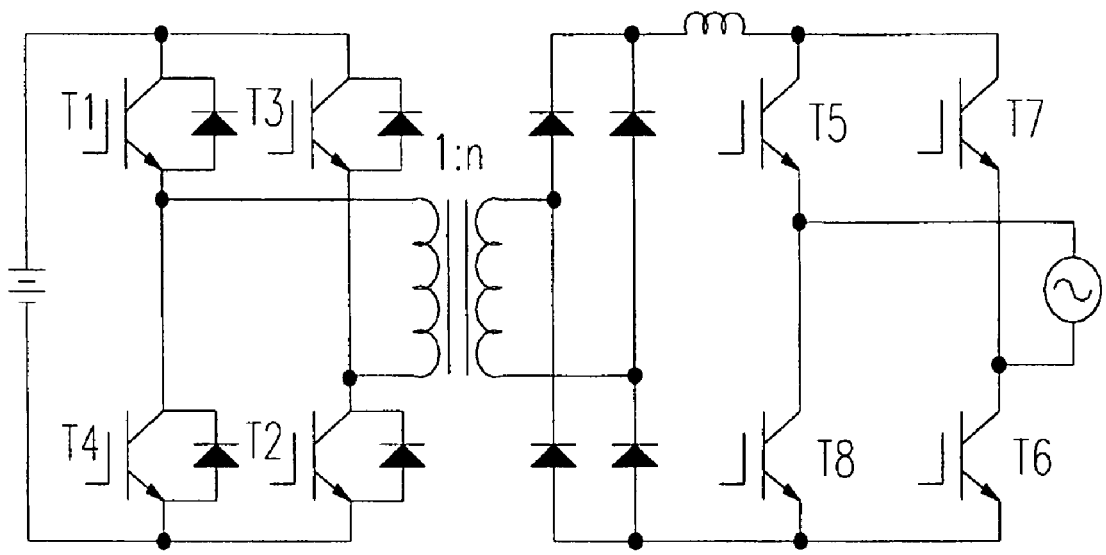
FIG. 5 is a schematic illustration of a prior art two stage inverter.
Figure 6:
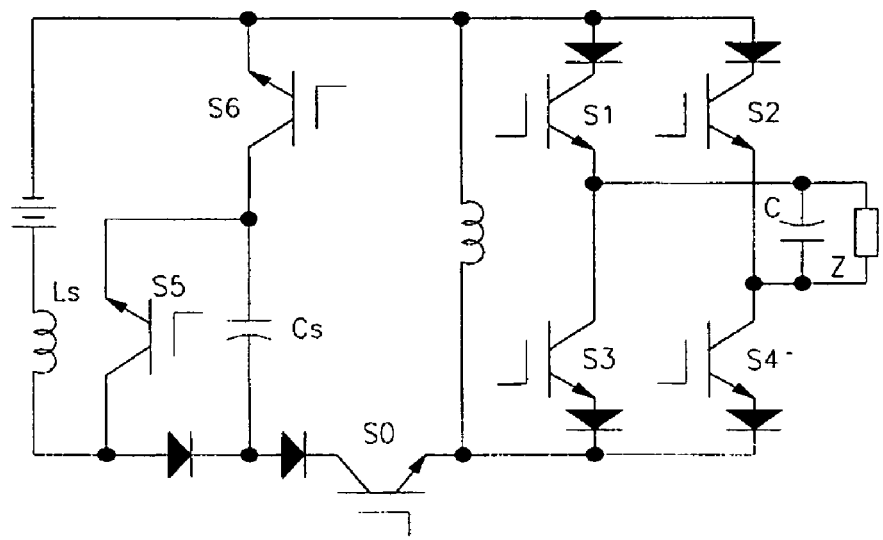
FIG. 6 is a schematic illustration of a prior art two stage buck-boost inverter.
Figure 7:
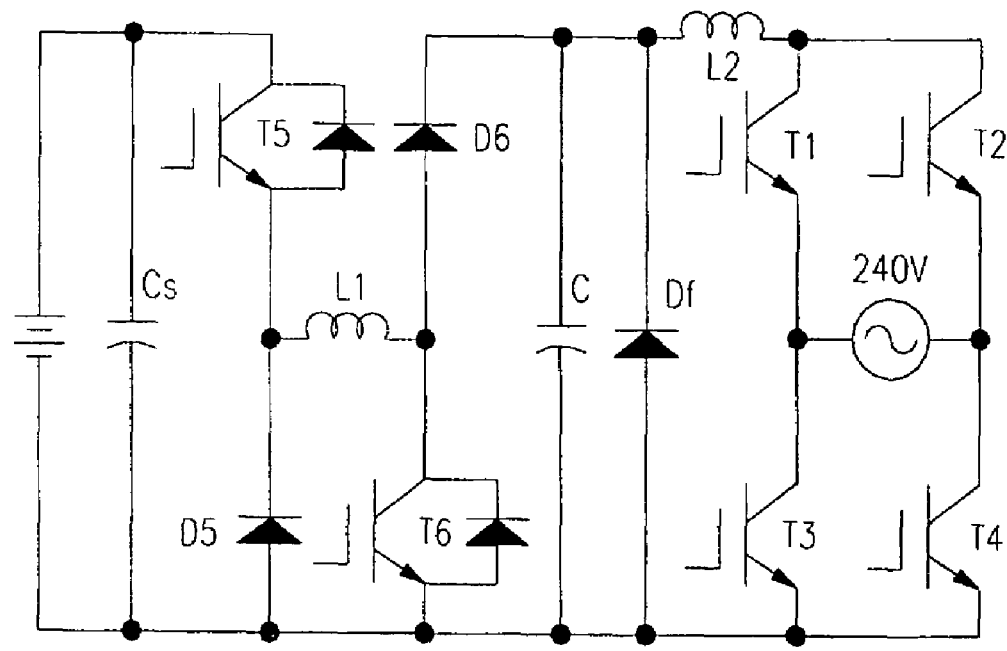
FIG. 7 is a schematic illustration of a prior art two stage buck-boost inverter.
Figure 8:
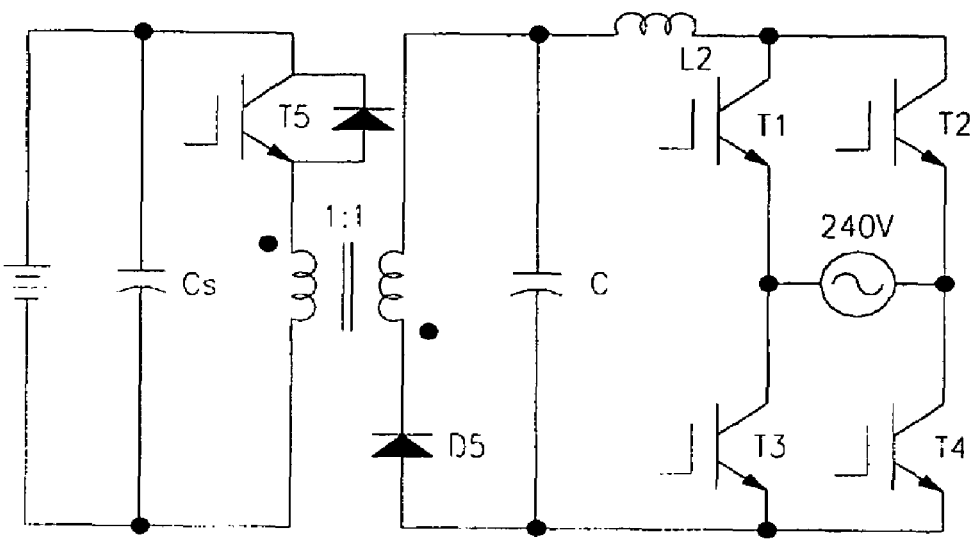
FIG. 8 is a schematic illustration of a prior art two stage isolated buck-boost inverter.

Basically, a sine reference wave, serving as modulating signal, is compared with a triangular carrier wave, and the intersection points determine the switching angles and pulse widths as in FIG. 3.1. The generated switch gating pulses vary proportionally with the modulating signal; in other words, the pulse width is maximum in the middle of each half period and decreases as cosine function towards either side. A variable-frequency variable-amplitude output can be obtained by varying the frequency and amplitude of the modulating signal.

For a typical SPWM inverter, the spectrum of harmonic frequencies in the output is shifted towards the high frequency and the lower-order harmonics are reduced significantly. Thus, the output filter elements can be smaller to attenuate only higher-order harmonics, which are carrier-frequency-related with modulating-frequency sidebands.

Figure 25:
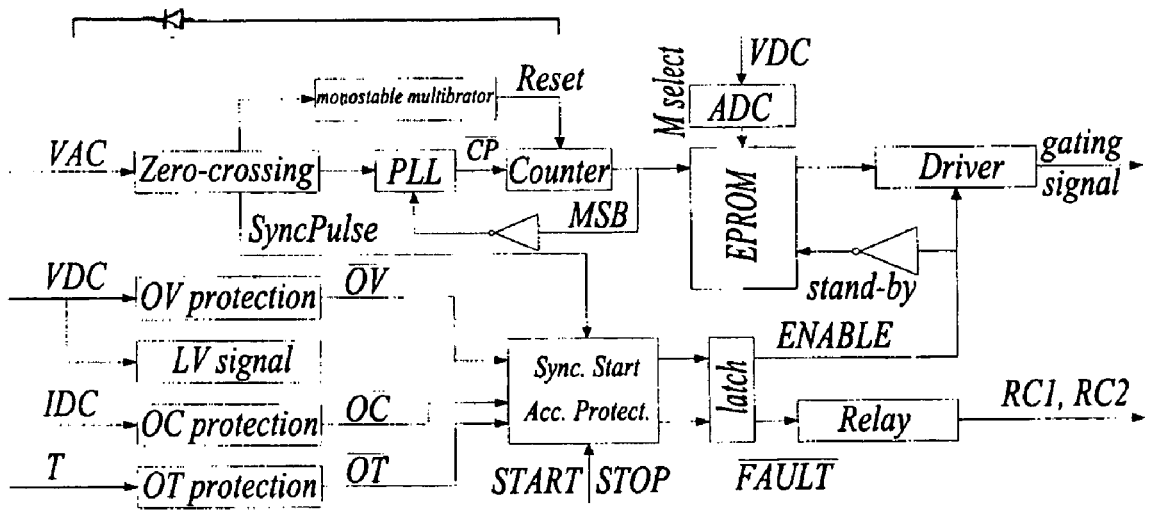
FIG. 25 is a block diagram of an exemplary control circuit of the present invention.

Sinusoidal PWM control strategy can be used with the $S^2B^2$ inverter of the present invention to provide a DCM current scheme. Unlike traditional stand-alone buck inverters, the output current is controlled to be sinusoidal for grid-connected systems. Closed-loop SPWM control provides further robustness and insensitivities to dc and ac variations as well as parametric uncertainties. An exemplary SPWM control circuit of the present invention is shown in FIG. 25. Such controllers are well suited to implementation on an integrated circuit, facilitating cost reduction.

The Single-Stage Buck-Boost ($S^2B^2$) inverter of the present invention is implemented with four or three power semiconductor switches and can deliver an ac output voltage from a dc input voltage which can be higher or lower than the ac output voltage.

The embodiment(s) of the invention described above is(are) intended to be exemplary only. The scope of the invention is therefore intended to be limited solely by the scope of the appended claims.

We claim:

1. A single-stage buck-boost inverter, comprising:
an input for receiving DC power;
an output operable to provide AC power;
a first inductor;
a first switching means to controllably connect said first inductor to said input;
a first discharge loop for conveying power to said output;
a second switching means to controllably connect said first inductor to said first discharge loop;
a second inductor magnetically coupled to said first inductor;
a second discharge loop for conveying power to said output;
a third switching means to controllably connect said second inductor to said second discharge loop.

2. An inverter as claimed in claim 1, wherein said first discharge loop is operable to convey power during a positive half cycle of output and said second discharge loop is operable to convey power during a negative half cycle of output.

3. An inverter as claimed in claim 2, further comprising a control means for controlling said first, second and third switching means so as to generate an AC power signal at said output.

4. An inverter as claimed in claim 3, wherein said first switching means comprises a first semiconductor switch and a second semiconductor switch.

5. An inverter as claimed in claim 4, wherein said second switching means comprises said first semiconductor switch and a third semiconductor switch and said third switching means comprises said second semiconductor switch and a fourth semiconductor switch.

6. An inverter as claimed in claim 5, wherein each said first and second discharge loop further comprises an isolation diode to isolate said output from said input.

7. An inverter as claimed in claim 3, wherein said first switching means comprises one semiconductor switch.

* * * * *